US005804641A

United States Patent [19]

Iwakawa

[11] Patent Number: 5,804,641

[45] Date of Patent: Sep. 8, 1998

[54] FOAMABLE COMPOSITION FOR CREATING A BARRIER TO PREVENT ATTACK OF HUMIDITY, FUNGI AND INSECTS

[75] Inventor: Toru Iwakawa, Tokyo, Japan

[73] Assignee: Nippon Eisei Center Co., Ltd., Tokyo, Japan

[21] Appl. No.: 692,262

[22] Filed: Aug. 5, 1996

Related U.S. Application Data

[63] Continuation of Ser. No. 420,824, Apr. 12, 1995, Pat. No. 5,549,869.

[51] Int. Cl.$^{6}$ .................................................. C08L 75/04

[52] U.S. Cl. ........................................ 524/507; 524/487

[58] Field of Search .................................. 524/507, 487

[56] References Cited

U.S. PATENT DOCUMENTS

| | | | |
|---|---|---|---|
| 3,919,145 | 11/1975 | Eckhoff | 524/405 |
| 4,143,010 | 3/1979 | Rak | 260/23 |
| 4,389,446 | 6/1983 | Blom et al. | 428/166 |
| 4,421,788 | 12/1983 | Kramer | 427/136 |
| 4,704,442 | 11/1987 | Just et al. | 526/273 |
| 4,809,462 | 3/1989 | Maeda | 43/124 |
| 4,874,641 | 10/1989 | Kittle | 427/244 |
| 4,889,710 | 12/1989 | Hagarty | 424/45 |
| 5,026,735 | 6/1991 | Stern | 521/50 |
| 5,124,363 | 6/1992 | Stern | 521/50 |
| 5,133,933 | 7/1992 | McIntosh | 422/41 |
| 5,215,786 | 6/1993 | Kittle | 427/244 |
| 5,284,844 | 2/1994 | Lorenz et al. | 514/222.5 |
| 5,346,699 | 9/1994 | Tiernan et al. | 424/405 |

FOREIGN PATENT DOCUMENTS

| | | |
|---|---|---|
| 59-55940 | 3/1984 | Japan . |
| 5955940 | 3/1984 | Japan . |

OTHER PUBLICATIONS

Higaki, "Clean Barrier Methods and its effects" Env. Management Tech. vol. 5, No. 4, 191–198 (1987).

*Primary Examiner*—Jeffrey T. Smith
*Attorney, Agent, or Firm*—Beveridge, DeGrandi, Weilacher & Young, L.L.P.

[57] ABSTRACT

A barrier to protect wood materials for house construction or wooden structures such as houses from humidity, moisture and/or biological attacks, such as wood decaying fungi and termites, is disclosed. The method is to treat wood itself or, preferably, the ground surface under the floor with a liquid containing a synthetic resin emulsion and an anti-fungal and wood-preservative agent and/or a pesticide such as termite-controlling agent, and further, a foaming agent. The barrier contains a selected copolymer of vinyl acetate and a polyurethane polymer.

19 Claims, 2 Drawing Sheets

FOAMABLE COMPOSITION FOR CREATING A BARRIER TO PREVENT ATTACK OF HUMIDITY, FUNGI AND INSECTS

REFERENCE TO A RELATED APPLICATION

This application is a continuation of my application Ser. No. 08/420,824 filed Apr. 12, 1995 now U.S. Pat. No. 5,549,869 which is relied on and incorporated herein by reference.

INTRODUCTION AND BACKGROUND

The present invention relates to a method of creating a barrier to protect wood materials used for construction and wooden structures from humidity and/or biological attacks, and more particularly against the effects of fungi growth or infestation by insects such as termites.

All types of wooden structures, and in particular wooden houses, are subject to being exposed to the action of humidity in the atmosphere and, depending on location, to dampness or water seepage. This creates an ideal atmosphere for growth of fungi such as mildew and the like. When wooden structures are attacked by wood-decaying fungi, they can be seriously damaged, especially when the foundation that supports the structure and stability of the house is attacked. The deterioration of wooden structures by the action of humidity and by the biological attacks are inter-related, because wood-decaying fungi and termites thrive and proliferate under humid conditions, such as are found under the floors of homes where water evaporates from the ground surface.

It is, therefore, very important to protect the wood materials employed for house construction and wooden houses and structures from the action of humidity, fungi, insects and other biological attacks in one convenient procedure.

Heretofore, proposals have been made to prevent the action of humidity from the ground surface and to control the biological attacks. For example, it has been suggested to cover the ground surface with polyethylene sheets in order to cut off humidity therefrom. Likewise, it has been proposed to cover the ground surface with sheets, called "termite-controlling sheets", in order to attain various objects, such as prevention of exposure to humidity, for wood preservation and for termite control at the same time.

However, these methods have occasioned a number of drawbacks. For instance, it is a labor intensive effort to spread sheets on a ground surface in a satisfactory manner. It is necessary to first cut sheets to adapt them to irregularly shaped foundations; in order to reduce the tendency to cause gaps thereby leading to imperfect prevention against humidity and moisture.

It has also been proposed in the past to spray a variety of synthetic resin containing liquid preparations, which can contain active ingredients such as termite-controlling agents and/or wood-preservative agents, on the ground surface under the wooden structure. However these methods also were not totally successful. For example, the synthetic resin liquid preparations tend to penetrate into the soil before a dried film is formed on the soil surface. Hence, a much larger quantity of the liquid is required in order to attain the desired objects of adequate protection. Further, as the soil surface is usually uneven, mounded parts may not be sufficiently treated with the liquid and, as the result, a uniform film may not be formed on the whole surface of the soil. This results in imperfect moisture and insect resistance and poor wood-preservative effects.

SUMMARY OF THE INVENTION

An object of the present invention is to avoid the defects of the conventional methods as have been described above and as known in the art. Another object of the present invention is to improve the protection of wood materials used in the construction of housing and wooden structures against moisture, fungi and insect damage.

In achieving the above and other objects one feature of the present invention relates to a unique barrier that is created from a specially formulated chemical composition.

According to another aspect of the invention, the ground surface under a house is treated with a liquid containing a selected synthetic resin emulsion and an anti-fungal and wood-preservative agent and/or a pesticide such as a termite-controlling agent.

In accordance with another aspect of the invention, the selected formulations contain a foaming agent to foam one of the components and to produce a foamed dried film on the ground surface thereby creating a foamed barrier between the ground and the wooden structure.

According to still another aspect of the invention, wood materials for house construction or wooden houses themselves are treated with a liquid containing a selected synthetic resin emulsion and an anti-fungal and wood-preservative agent and/or a pesticide, such as a termite-controlling agent, to form a dried film on the exposed surfaces of wood materials or on the surface of wood houses that are exposed to the attack by moisture, fungi and insects.

BRIEF DESCRIPTION OF THE DRAWINGS

The invention will be further understood, with regard to the drawings herein.

DETAILED DESCRIPTION OF THE INVENTION

Figure 1:
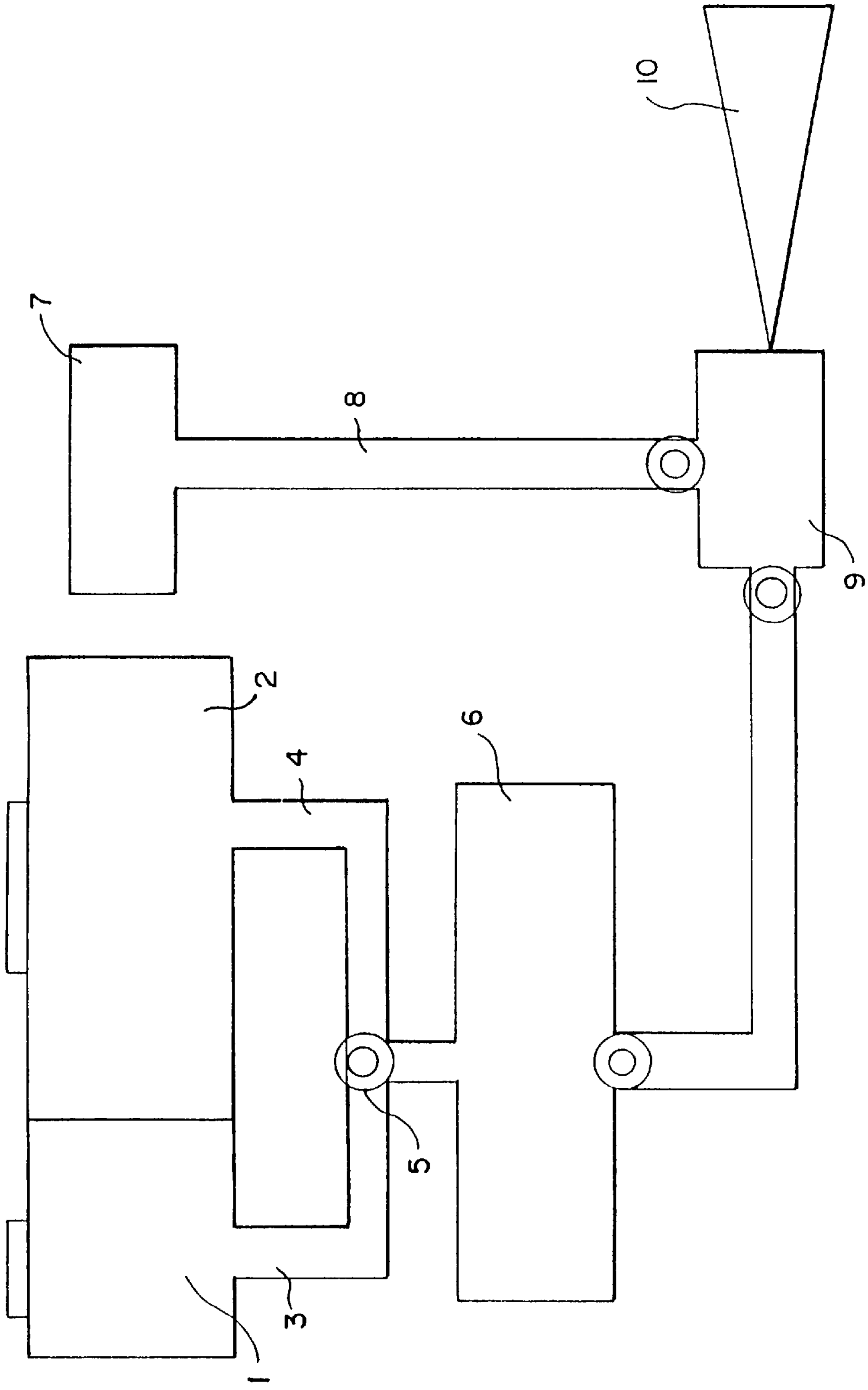
FIG. 1 shows a schematic representation of the spraying system used to practice the invention.

According to a detailed aspect of the invention, when a selected synthetic resin liquid is applied to the soil surface under a wooden structure, it is essential that it contains a foaming agent. The presence of a foaming agent causes the liquid to be foamed either before, during or after the treatment. The treatment is normally performed by spraying the synthetic resin liquid on the solid soil surface. When the liquid is sprayed, either as a foam or foamed in situ on the soil surface or during spraying by the action of a foaming agent, the foamed liquid spreads smoothly on the ground surface. This is quite in contrast to the conventional method that employs no foaming agent, according to which, as describe above, a large quantity of liquid is required, as it tends to penetrate into the solid rather than spread on top of the soil surface.

Thus, according to the present method, the quantity of the liquid required for the treatment may be reduced compared with prior methods. Further, as the liquid of the invention spreads smoothly on the soil surface, not only the concave part but also convex parts of the soil surface may be sufficiently treated so as to form an even, dried film. Thus, the treatment can be carried out regardless of the topography of the soil surface.

The method of the invention provides an easy way of working at difference places, such as the ground area under a wooden floor. The treatment with the liquid and the foaming of the composition may readily be performed, for example, by spraying, even after the foundation of the structure has been put in place. Accordingly, the present method may effectively be applied to fully constructed houses. Furthermore, the method of the invention has a practical advantage in that the liquid in a foamed condition is not scattered too much when it is sprayed. This lessens the danger to workers by exposure to the liquid and saves the volume of the liquid required for the treatment.

When the liquid is foamed after application to the soil surface, the situation differs slightly, but similar effects may still be obtained.

According to this mode of treatment, the liquid somewhat penetrates into the soil near the surface. The synthetic resin and the active ingredients contained in the liquid emerge thereafter onto the solid surface as the foaming begins and effectively covers uneven soil surfaces.

As described above, the liquid may uniformly be treated on the soil surface according to the method of the invention.

The selected synthetic resin containing liquid formulation of the invention contains a synthetic resin emulsion which is a modified vinyl acetate emulsion.

The composition of the vinyl acetate component of the emulsion is a copolymer of vinyl acetate, 2-ethylhexyl acrylate and vinyl ester of versatic acid. The monomeric components which are copolymerized to form the copolymer can be illustrated as follows:

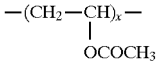
vinyl acetate (X)

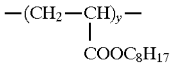
2-ethylhexyl acrylate (Y)

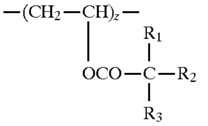
vinyl ester of versatic acid (Z)

wherein $R_1 + R_2 + R_3 = C_8$ and X:Y:Z = 6:2:2

Although the above ratio of monomeric components is preferred, the proportions can be varied, usually by 10%.

In carrying out the present invention a protective barrier is created by reacting a urethane based resin, as described below, with the above defined synthetic modified vinyl acetate copolymer resin emulsion containing an anti-termitic agent at the nozzle end of a specially designed barrier spaying machine, shown in FIG. 2 to form a fast-setting resin film on the surface of soil or on the surface of an inorganic foundation such as cinder block, concrete and the like. Since the anti-termitic agent is contained in the synthetic resin film, to remain effective for a long period of time, the film should be formed to be uniformly thick. The accuracy of the spray work can be easily visually judged. So if any thin or defective portion is found in the film, it should be corrected immediately. It should be ensured that the completed film does not inhibit the ventilation under the floor so that the film can remain durable in the environment under the floor to sustain the performance of the barrier layer of the invention for a very long period of time.

The foamed film which is formed after spraying and drying will be sufficiently uniform and thick so as to attain the desired prevention of water evaporation from the solid surface and greatly improve moisture resistance. And, in cooperation with a wood-preservative and/or termite-controlling agent, and the like, the layer also attains a superior effect against the biological attacks.

Referring now to FIG. 1, the barrier spraying system of the present invention is schematically illustrated and includes a water tank (1) and a vinyl resin emulsion tank (2), connected with conduits (3) and (4) to metering valve (5) which controls the amounts of water and vinyl resin emulsion flowing to the power sprayer (6).

The urethane resin reactant, called the setting agent herein, is conveyed from tank (7) through conduit (8) to the spray nozzle (9). The urethane can be suctioned from its holding tank (7) and flows to join and react with the vinyl emulsion from (2) at the spray nozzle (9) to form the foam forming barrier spray (10) which is then directed to the surface to be coated.

The setting component used herein is a foamable polyurethane resin which is of a hydrophilic nature. It is typically made by reacting a polyurethane forming polyisocyanate such as tolylene diisocyanate with an active hydrogen containing polyhydric alcohol such as polypropylene glycol in an inert organic solvent such as butyl lactone and monopropyl ether.

A suitable example of such a material is the commercially available product PUC 165-5-6 which is a light yellow transparent liquid, viscosity of 100–120 cps at 25° C., 1.01–1.04 specific gravity at 25° C., with a non-volatile content of about 70%.

The isocyanate is used in an amount of up to 10% by weight and the polypropylene glycol is present in an amount of at least 60% by weight. The solvent in the reaction system is about 30% and preferably consists of 15% butyl lactone and 15% monopropyl ether. Such polyurethanes are well known in the art.

Still another advantage of the method of the invention is that a heat-insulation effect may also be brought about as the dried film, which can be made sufficiently thick, contains a multitude of air bubbles as a result of foaming and exerts an insulating effect.

As described above, the method of the invention may be applied not only to the ground surface but also to the wooden parts of houses, and further to wood materials for house construction.

In cases when the method of the invention is directly applied to any of the wooden parts described above (hereinafter simply referred to as "wood") instead of to the soil beneath the wood, it is not essential that the liquid contains a foaming agent. This is because the surface of wood is normally even as opposed to the soil surface which may be rough and uneven.

However, it is preferable that a foaming agent be contained in the liquid and the foaming be performed upon treatment.

In these cases too, foaming may be performed either before, during or after the treatment.

The following table contains some observations about the reaction conditions to be followed:

| Item | Principal resin emulsion | Setting agent |
|---|---|---|
| Mixing | To be mixed with an equal quantity of water, and | To be used as is |

-continued

| Item | Principal resin emulsion | Setting agent |
|---|---|---|
| | sufficiently stirred, to make a homogeneous diluted solution | |
| Precautions for mixing | Care should be exercised not to allow any foreign matter to be entrained. Unless the diluted solution is homogeneous a normal film may not be formed. | Care should be exercised not to allow any foreign matter to be entrained. The setting agent should be prevented from being mixed with water, by being kept away from any splash of water. |
| Mixing ratio of clean barrier solution | Diluted principal resin emulsion (vinyl acetate resin emulsion containing the antitermitic agent). | Setting agent (hydrophilic polyurethane resin) |
| Temperature of Clean Barrier solution | 3°–40° C. (optimum temperatures are 20°–30° C.) | |

As was also the case with the treatment of the soil surface, the timing of foaming may be controlled by the choice of types and amounts of foaming agent and other factors.

When the method of the invention is applied to wood, the treatment is normally effected by spraying, although immersion, impregnation and other conventional methods may alternatively be used.

By the method of the invention, the synthetic resin containing liquid reaches well into difficult to access areas such as crevices, knotholes, openings or gaps of joints, particularly when the treatment is performed in the presence of a foaming agent. Thus, for example, when the treatment is effected on a surface of wood by way of spraying, the liquid can reach even to the reverse side of the wood.

The anti-fungal and wood-preservative agent and/or pesticidal, termite-controlling agent to be employed in the method of the invention, include, for example, boron compounds; anti-fungal and wood-preservative agents such as phenols Nos. 1, 2 or 3 as prescribed by Japanese Industrial Standard (JIS) K 1550, inorganic fluoride compounds, Nos. 1 or 2, chromium, copper or arsine compounds as prescribed by JIS K 1554 and creosote oil as prescribed by JIS K 2439.

These and other conventional pesticides as well as environmentally friendly ingredients may be employed either dissolved in a suitable solvent such as water, or in the form of an undiluted oil or liquid.

The quantity of termitic agent, pesticides or the like used herein is not critical and will depend on likelihood of infestation. A sufficient amount is used to be effective against the insects, fungus, etc. The maximum amount used is purely a matter of economics and is not critical.

The foaming agent to be employed in the method of the invention includes conventional surfactants having the foaming property, preferably anionic surfactants such as fatty acid esters, alkyl sulfates, alkylarylsulfonates (e.g. alkylbenzenesulfonates) or alkylsulfonates; and isocyanates such as methylene diisocyanate (MDI) and tolylene diisocyanate (TDI). All suitable foaming agents can be used for purposes of this invention.

The amount of foaming agent used is a matter within the scope of a person familiar with urethane technology and can vary as is well known. For a discussion of polyurethane foams and blowing agents, see Kirk-Othmer: Encyclopedia of Chemical Technology, a standard work in the art.

The liquid according to the present invention may contain, if desired, an organic filler such as titanium oxide, clay or calcium carbonate, the use of which may bring about a harder dried film. It may also contain a wax emulsion such as paraffin wax emulsion or a silicone resin, the use of which may improve the humidity-resistant property.

A viscosity-increasing agent such as pvoal (polyvinyl acetate), or any additional agent that will promote hardening of the dried film can also be present.

Normally, the liquid is diluted with water, upon treatment, in order to improve the efficiency of work.

The mixing ratio of each component in the liquid will largely vary depending on the various factors, such as conditions of the soil surface under the floor and the type of foaming agent, and the like. Typically, when a surfactant is employed as the foaming agent, it is used in an amount of 1–5 parts, preferably 1–3 parts by weight, based on 100 parts by weight of vinyl acetate emulsion. When an isocyanate is used as the foaming agent, the ratio will not differ very much, and it is normally used in an amount of 1–5 parts by weight, based on 100 parts by weight of vinyl acetate emulsion.

Figure 2:
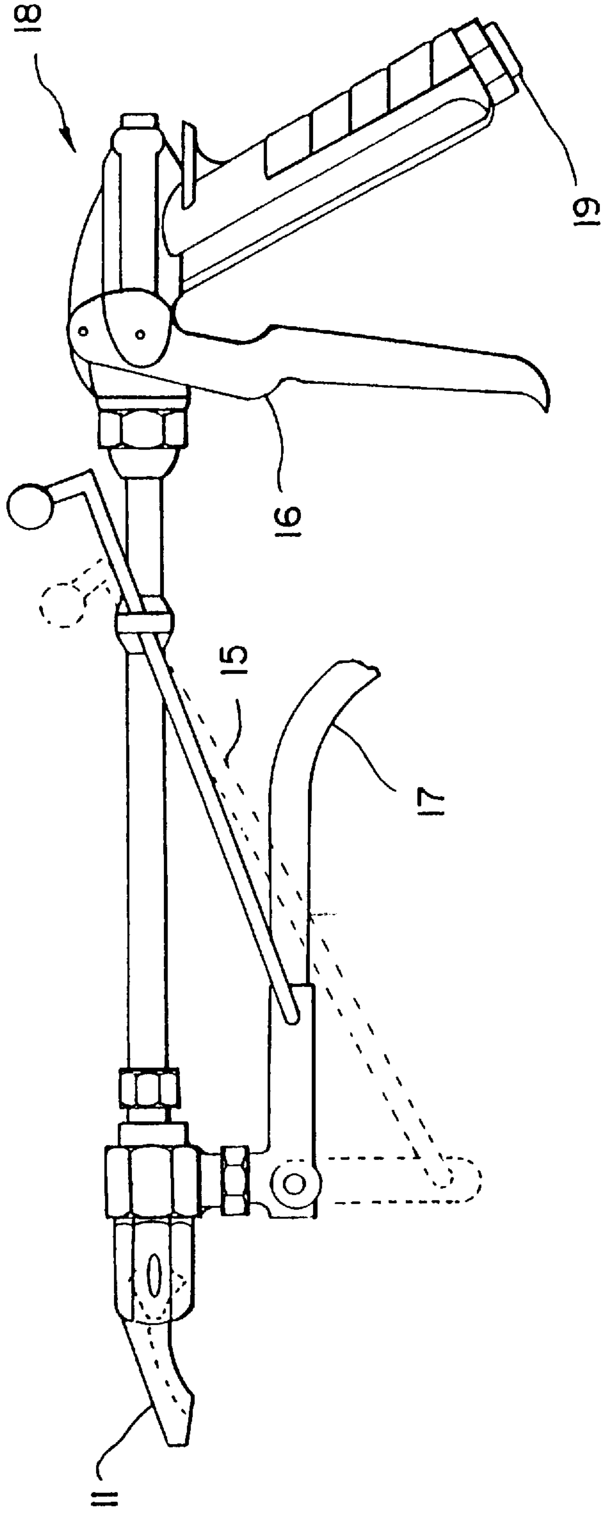
FIG. 2 shows a schematic view of a spray gun used to apply the selected formulation to form the moisture barrier film in accordance with the invention.

In carrying out the invention to prepare and form the protective barrier layer, the apparatus shown in FIG. 2 can conveniently be used. The principal resin emulsion which is the vinyl acetate is placed into the principal resin emulsion tank (2) through its inlet. The washing liquid is placed into the washing tank (1) through its inlet. When mixing equal quantities of principal resin emulsion and water, stirring is used for forming a homogenous diluted solution. To use the power sprayer, the change-over cocks of the water suction port and the spill port are set to the principal resin emulsion tank side. For washing, the change-over cock of the water suction port is set to the washing tank side. The cock of the principal resin emulsion hose discharge port is then closed, and the motor switch is turned on for starting. The nozzle gun spraying machine is attached to the principal resin emulsion hose discharge port. The principal resin emulsion hose is then extended to the place to be treated. Typically, the pressure is set at 20 $kg/cm^2$ before spraying. The principal resin emulsion hose should be used within a range of about 50 m.

The polyurethane setting agent hose is connected to the setting agent suction port of the nozzle gun spraying machine. If the setting agent hose is attached with insufficient clamping, adequate suction will not be provided. The urethane setting agent hose is at a proper length within 10 m. The urethane setting agent hose (8) is connected to the setting agent tank 7. The nozzle tip is adjusted to keep the clearance between the nozzle control at the end of the nozzle gun of the spraying machine and the nozzle tip in the range of 1 to 3 mm (3 mm when the air temperature is lower than 25° C. and 1 to 2 mm when 25° C. or higher).

If the change-over lever of the nozzle gun of spraying machine is set at the setting agent side, the diluted principal resin emulsion and the setting agent will be ejected simultaneously at a ratio of about 10:1 in parts by weight. Since the setting agent is automatically suctioned by the negative pressure of the principal resin emulsion, the air in the hose up to the nozzle end should be extracted. When the urethane setting agent reaches the nozzle end, the principal resin emulsion is sprayed at a rate of 2.0 to 2.5 $kg/m^2$.

Generally, the ratio of vinyl emulsion to urethane setting agent is 10:0.5 to 10:2, preferably 10:1 parts by weight. The amounts chosen can be varied depending on the results to be achieved and adjustment of proportions is within the skill of the art.

To halt spraying, the change-over lever of the nozzle gun is set to OFF (air suction) side, and the diluted principal resin emulsion is discharged for several seconds, before halting.

The nozzle gun is used as follows:

The principal resin emulsion hose is attached to the principal resin emulsion joint port (19) of the nozzle gun (18) of the spraying machine.

The urethane setting agent hose (17) is connected to the setting agent suction port. The change-over lever (15) is set at position A shown by the solid line, and the principal resin emulsion control lever (16) is set to eject the diluted principal resin emulsion and the setting agent mixed at a ratio of about 10:1. To halt spraying, the change-over lever (15) is returned to position B shown by the dotted line. The urethane setting agent is automatically suctioned due to the negative pressure of the principal resin emulsion, and it takes about 30 to 40 seconds until the setting agent reaches the nozzle end (11). The power sprayer is set at a pressure of 20 kg/cm$^2$, and the nozzle gun is connected to the principal resin emulsion hose. Then, using water or diluted principal resin emulsion, the ejected quantity is adjusted to be in a range from 5.2 to 6 l/m using a graduated container or meter. The negative pressure gauge is attached to the setting agent hose within 10 m and the hose is connected to the setting agent suction side of the nozzle gun of the spraying machine. The pressure of the power sprayer is then set at 20 kg/cm$^2$, and the principal resin emulsion lever is actuated.

The nozzle tip clearance is adjusted (in a range of 1 to 3 mm) with the negative pressure gauge indication kept in a range from 48 to 62 cm/Hg.

If there is no negative pressure gauge, spray on a trial basis, to measure the decreased quantity of the setting agent, for confirming the ejected quantity.

The invention is further illustrated by the following Examples.

EXAMPLE 1

A liquid preparation was prepared from a vinyl acetate emulsion a termite-controlling agent (80% chlordane emulsifiable concentrate diluted with water to 20 times weight), and a foaming agent (Emal AD-25, Kao-Atlas K. K.). The liquid was sprayed onto a ground surface under the floor of a wooden structure with a spray gun in two ways; the one that was foamed in situ, and another that had been foamed previously with a stirrer. After a spontaneous drying, there was obtained a hardened film having the thickness 500 $\mu$, which was tested for the moisture permeability according to the method as prescribed by JIS Z 0208 (Cup method), which result showed the value 282.0 g/m$^2$.24 hours.

It is known that the moisture permeability for a Japanese paper (which corresponds to a control where no hardened film is formed on the ground surface) is 994.7 g/m$^2$.24 hours and, from the comparison of the figures, it is clearly shown that a superior moisture-resistant effect is obtained by the method of the invention.

EXAMPLE 2

The procedures of Example 1 were substantially followed, except that a vinyl acetate emulsion having the non-volatile content of 35% and the viscosity of 100,000 cps was used, to give a dried film. There was obtained a trans-humidity value which was similar to that in Example 1.

EXAMPLE 3

The procedures of Example 1 were substantially followed, except that an emulsifiable concentrate containing 80% chlordane and 12% 4-chlorophenyl-3-iodopropargylformal (wood-preservative agent) was used, affording a hardened film.

EXAMPLE 4

The procedures of Example 1 were substantially followed, except that 3 parts by weight of methylenediisocyanate was used as a foaming agent, giving a hardened film.

EXAMPLE 5

The procedure of Example 1 were substantially followed, except that 5% by weight of a paraffin wax emulsion was added to the liquid preparation, affording a hardened film.

The spray work procedure to carry out the present invention can be carried out as follows:

The principal resin emulsion and urethane setting agent for the barrier spray work is generally diluted by an equal quantity of water to form a diluted emulsion. The urethane setting agent is used as is. Then the area to be sprayed is measured, for deciding the quantity to be sprayed. The quantity of diluted principal resin emulsion can be calculated as:

=Area to be sprayed (m$^2$)×Quantity to be sprayed (kg)

=Quantity of diluted principal resin emulsion (kg)/2

The diluted principal resin emulsion is prepared by mixing 1 part of principal resin emulsion and 1 part of water.

Example: For spraying an area of 100m$^2$ with the diluted principal resin emulsion at 2 kg/M$^2$ Quantity of diluted principal resin emulsion =100m$^2$×2 kg=200 kg Quantity of principal resin emulsion=200 kg/2=100 kg The nozzle gun of the spraying machine is adjusted to keep the ratio of diluted principal resin emulsion to setting agent at 10:1.

Quantity of setting agent used (kg)=Area to be sprayed (m$^2$)× Quantity to be sprayed (kg)/10.

Example: For spraying an area of 100 m$^2$ with the diluted principal resin emulsion at 2 kg/m$^2$:

Quantity of setting agent used=(100 m$^2$×2 kg)/10=20 kg.

Before applying to the soil, the soil to be sprayed is cleaned by removing all the residual materials, debris, and trash from under the floor. Then the soil is leveled using a rake, lay-out tool, land grading machine, etc. If the ground surface is very rough, high portions are cut to fill low portions with the cut soil, for leveling.

If a stone or debris, etc. protrudes above the soil surface, it is pressed from above, to bury it into the soil, or removed by digging and filling the dug hole with soil. If the soil surface is dry, it is recommended to sprinkle a small quantity of water, for wetting the soil surface, before leveling.

The nozzle end is kept away from the ground surface by about 40 to 50 cm, when spraying to prevent the same from being blown up by the discharge pressure in the case of sandy soil.

For clay type soil, ordinary spray work can be adopted. However, when the soil is fissured by drying, the soil should be compacted by rolling. In the case of fine gravel, leveling with rolling compaction is recommended. In the case of coarse gravel, it should be leveled at first, and re-leveled while filling the gravel gaps with sand under rolling compaction.

With the spraying machine having the nozzle gun attached, the nozzle lever is set to ON (setting agent side), and the diluted principal resin emulsion is ejected from the nozzle end into a polyethylene container or oil can, etc. without mixing with the setting agent, for extracting the air in the setting agent hose.

The spray work for a new building should be executed when floor joists have been attached to the entire floor framing.

For spraying under the floor of an existing building, spraying should be started from the deepest portion under the floor to ensure that the operator never moves over the sprayed portions. When the spray work is executed twice for a new building, it is sprayed thinly at first to an extent that the surface soil is visible through the thin film, and then sprayed a second time for finishing.

Care should be exercised not to damage the film especially immediately after completion of spray work. Therefore, portions sprayed with the solution should not be disturbed for 1 to 2 days after completion of spray work.

Further variations and modifications of the foregoing will be apparent to-those skilled in the art from the foregoing and are intended to be encompassed by the claims appended hereto.

I claim:

1. A foamable composition for creating a barrier to protect from moisture and/or biological attacks which comprises:

(a) a liquid containing a synthetic resin emulsion, said synthetic resin emulsion being a copolymer of:

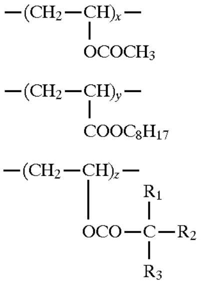

vinyl acetate (X)

2-ethylhexyl acrylate (Y)

vinyl ester of versatic acid (Z)

wherein $R_1+R_2+R_3=C_8$; and (b) a foaming agent.

2. The composition according to claim 1, wherein the foaming agent is a surfactant or a diisocyanate compound.

3. The composition according to claim 2, wherein the surfactant is an anionic surfactant.

4. The composition according to claim 2, wherein the diisocyanate compound is methylene diisocyanate.

5. The composition according to claim 1, wherein a pesticide is present.

6. The composition according to claim 1, wherein the liquid further contains paraffin wax.

7. The composition according to claim 1, wherein said foaming agent is a polyurethane.

8. The composition according to claim 5 wherein said pesticide is a termite-controlling agent.

9. The composition according to claim 1 which is mixed together.

10. The composition according to claim 1 wherein the ratio of vinyl emulsion to foaming agent is 10:05 to 10:2.

11. The composition according to claim 10 wherein said ratio is about 10:1.

12. A foamable composition for creating a barrier to protect from moisture and/or biological attacks which comprises:

(a) a liquid containing a synthetic resin emulsion and an anti-fungal and wood-preservative agent and/or a pesticide sufficient to form a dried film, said synthetic resin emulsion being a copolymer of:

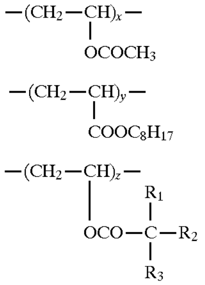

vinyl acetate (X)

2-ethylhexyl acylate (Y)

vinyl ester of versatic acid (Z)

wherein $R_1+R_2+R_3=C_8$; and (b) a foaming agent.

13. A system for creating a foamed barrier to protect against moisture and/or biological attacks which comprises:

(a) a first tank containing a liquid comprising a synthetic resin emulsion, said synthetic resin emulsion being a copolymer of:

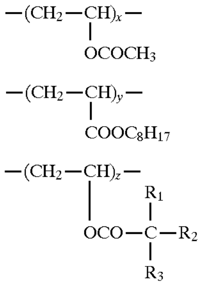

vinyl acetate (X)

2-ethylhexyl acrylate (Y)

vinyl ester of versatic acid (Z)

wherein $R_1+R_2+R_3=C_8$, and an anti-fungal agent, wood-preservative agent, pesticide or mixture thereof; and (b) a second tank containing a setting agent which is a foaming agent.

14. The system according to claim 13, wherein said setting agent is an admixture of a polypropylene glycol and a diisocyanate compound.

15. The system according to claim 13, wherein a termiticide is present in said first tank.

16. The system according to claim 14, wherein said diisocyanate compound is methylene diisocyanate.

17. The system according to claim 14, wherein said diisocyanate is tolyene diisocyanate.

18. The system according to claim 13, wherein said second tank further contains an inert organic solvent.

19. The system according to claim 18, wherein said solvent is a butyrolactone.

* * * * *